Patented Sept. 30, 1930

1,777,266

UNITED STATES PATENT OFFICE

GEORG KALISCHER AND KARL KELLER, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS OF MANUFACTURING HALOGEN-SUBSTITUTED AROMATIC TERTIARY AMINES

No Drawing. Application filed July 8, 1926, Serial No. 121,281, and in Germany July 15, 1925.

Our invention consists in a novel and convenient manner of producing halogen, particularly chloro and bromo, substituted, aromatic tertiary amines and in certain chloro and bromo substituted aromatic tertiary amines obtained by this process.

No generally applicable method for introducing halogen into the nucleus of aromatic tertiary amines has heretofore been known. As a matter of fact undesirable by-products, probably due to the sensitiveness to oxidation of the tertiary aromatic amines, themselves, are mainly obtained when using the usual methods of chlorination.

We have now found that mineral acid salts of tertiary aromatic amines, with a free ortho or para position, when dissolved in aqueous solution, react very readily with chlorine or bromine to form substitution products, containing one or two halogen atoms, according to the amount of chlorine or bromine used. The reaction proceeds at ordinary or only slightly elevated temperature. The reaction is usually carried out by introducing chlorine or bromine into the aqueous or free acid containing solution of the amine by hydochloride or other mineral salts of same. The chlorine or bromine can also be produced in the solution itself, as for instance by adding a chlorate or bromate to the amine salt solution containing an excess hydrochloric acid.

The halogen atoms enter preferably in ortho position to the dialkylamino group, and to a lesser extent in para position. If the para position is substituted by an alkyl, aryl, aralkyl, halogen etc. group the halogen atoms enter substantially only in ortho position.

It is possible by this novel process to produce very valuable ortho halogen substituted tertiary aromatic amines, which could heretofore not be produced by any known method or only by complicated processes such as alkylation of ortho chloro anilines etc.

Amongst the aromatic tertiary amines which are particularly valuable for our novel process are those in which two of the nitrogen valencies are satisfied by two like or two different alkyl groups. Of particular interest are also such amines in which the para position of the dialkylamino group is substituted by an alkyl, aryl, aralkyl group, or halogen atom.

These compounds can be represented by the general formula:

in which the two X's stand for like or different alkyl groups, Y for hydrogen, halogen, an alkyl, aryl or aralkyl group.

Amongst the new products not heretofore described and which are easily available by our novel process we might mention diortho-halogen-tetra-alkyl-diamino - diphenylmethanes.

The di-chloro - tetra - methyl - diamino-diphenylmethane of the probable formula:

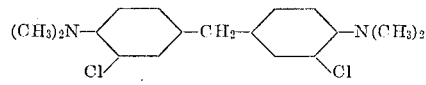

which is obtained according to our invention by reacting with chlorine in aqueous or free acid containing solution upon the hydrochloride of tetra-methyl-diamino-diphenyl-methane is a light yellow colored viscous oil boiling under reduced pressure; viz., 36 m/m. mercury at about 276–277° C.

In order to further illustrate our invention the following examples are given, the parts being by weight, but it is understood that our invention is not limited to the particular products or reacting conditions mentioned therein:

*Example 1.*—135 parts dimethyl-p-toluidine are dissolved in 130 parts 20° Bé. hydrochloric acid and 150 parts water. Into this solution one introduces with good stirring a slow current of chlorine gas at a temperature of 15–20° C. until an increase of weight of 71 parts is obtained. The solution is now filtered off from a few impurities and made alkaline by the addition of caustic soda, an oil separates with excellent yield which is isolated in the usual manner. It represents the 1-methyl-3-chloro-4-dimethylamino-benzene of the formula:

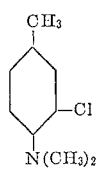

boiling at 225–226°.

*Example 2.*—135 parts dimethyl-p-toluidine are dissolved in 130 parts 20° Bé. hydrochloric acid and 150 parts water, 160 parts bromine are added to this solution at a temperature of 15–20° C. and the reaction mass kept stirring until all of the bromine is absorbed. The solution is made alkaline with caustic soda and the separated oil isolated. It represents the 1-methyl-3-bromo-4-dimethylamino-benzene of the formula:

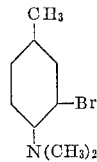

and boils at 235–240° C.

*Example 3.*—171 parts dimethyl-β-naphthylamine are dissolved in 130 parts hydrochloric acid and 500 parts water. Into this solution one introduces at 20–30° C. a slow current of chlorine gas until an increase in weight of 71 parts is obtained. The monochloro product obtained is isolated in the usual manner. It is a yellowish oil boiling at 22 m/m. mercury at 180–185° C. From its chemical behavior it is concluded that it is the 1-chloro-2-dimethylamino-naphthalene of the formula:

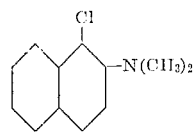

Using the equivalent amount of bromine the 1-bromo-2-dimethylamino-naphthalene is obtained.

*Example 4.*—121 parts dimethylaniline are dissolved in 130 parts 20° Bé. hydrochloric acid and 150 parts water, chlorine is introduced into this solution until about 71 parts of it have been absorbed. The chlorinated product is isolated and distilled. It boils between 206 and 239° C., it has a terpene-like odor and represents a mixture containing predominantly o-chloro-dimethylaniline of the formula:

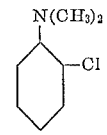

with some o-p-dichloro-dimethylaniline of the formula:

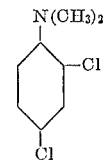

and unreacted dimethylaniline.

If twice the above mentioned amount of chlorine, about 142 parts, is introduced a product is obtained which is predominently o-p-dichloro-dimethylaniline.

*Example 5.*—254 parts tetra-methyldiamino-diphenylmethane are dissolved hot in 275 parts 20° Bé. hydrochloric acid and diluted with 300 parts water. Chlorine is introduced into this solution at 15–20° C. until 142 parts of it have been absorbed. The reaction mass is made alkaline and a heavy brownish oil separates. It is obtained in pure state by distillation in vacuum, a light yellow oil is so obtained boiling at 276–277° C. under 36 m/m. pressure. It is the 3-3'-dichloro-4-4'-dimethylamino-diphenylmethane of the formula:

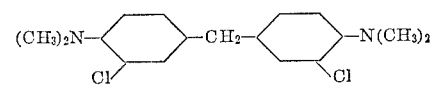

We claim:
1. In processes of making nuclear halogen substituted tetro-alkyl-diamino-diphenylmethane compounds the step comprising acting with one of the halogens, chlorine and bromine, upon aqueous solutions of aromatic tetra-alkyl-diamino-diphenylmethane compounds containing at least enough mineral acid to neutralize the acid compounds.

2. In processes of making 3-3'-dichloro-4-4'-tetramethyl-diamino-diphenylmethane the step comprising acting with chlorine at about room temperature upon aqueous solutions of the hydrochloride of 4-4'-tetramethyl-diamino-diphenylmethane.

In testimony whereof, we affix our signatures.

GEORG KALISCHER.
KARL KELLER.